Aug. 6, 1968  J. C. MEDLEY ET AL  3,395,946
HYDRAULIC BRAKE CIRCUIT FOR DUAL VEHICLES
Filed Oct. 23, 1965  3 Sheets-Sheet 2
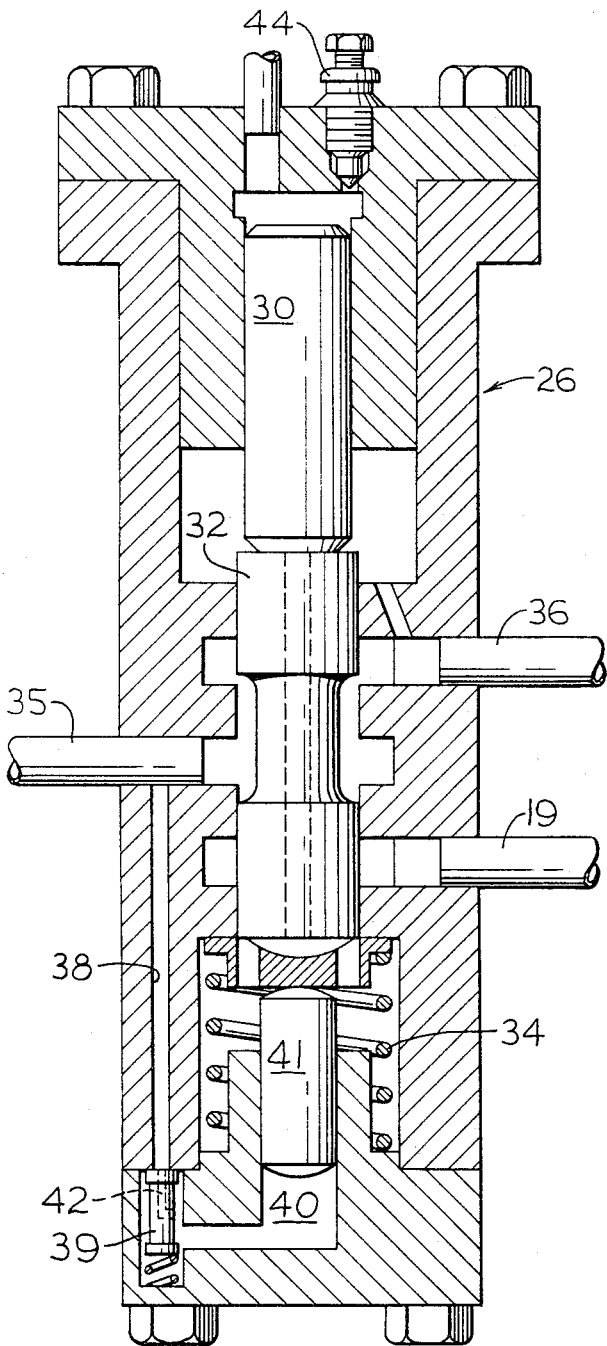
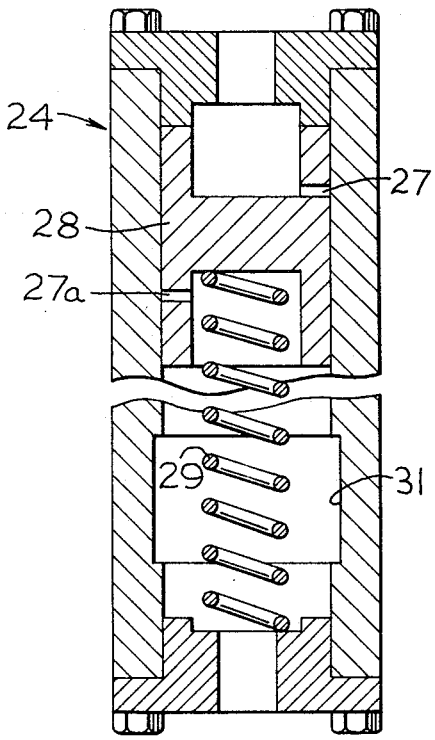
INVENTORS
JACKSON C. MEDLEY
DONALD L. SMITH
MAURIC F. FRANZ
ATTORNEYS

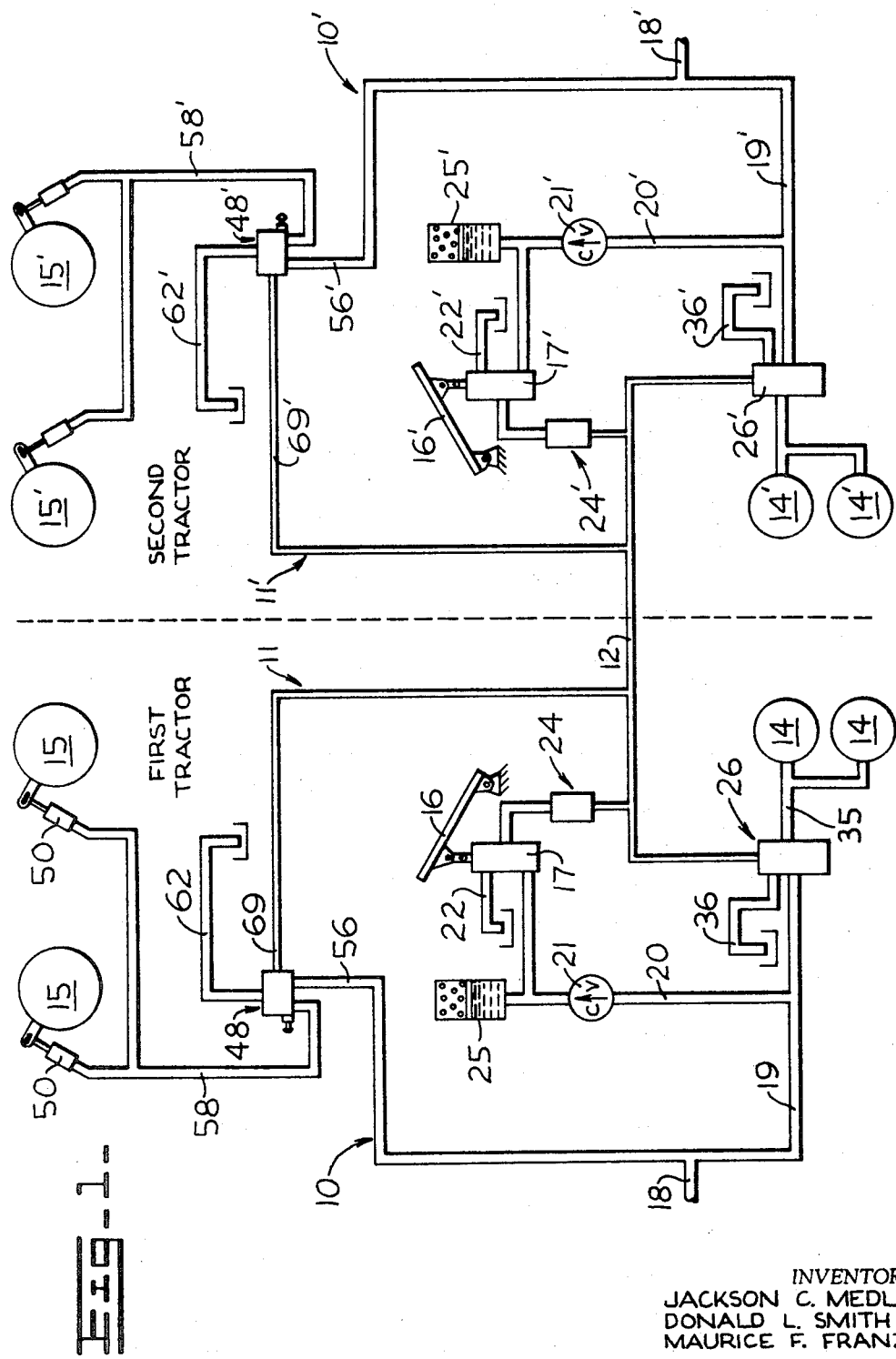

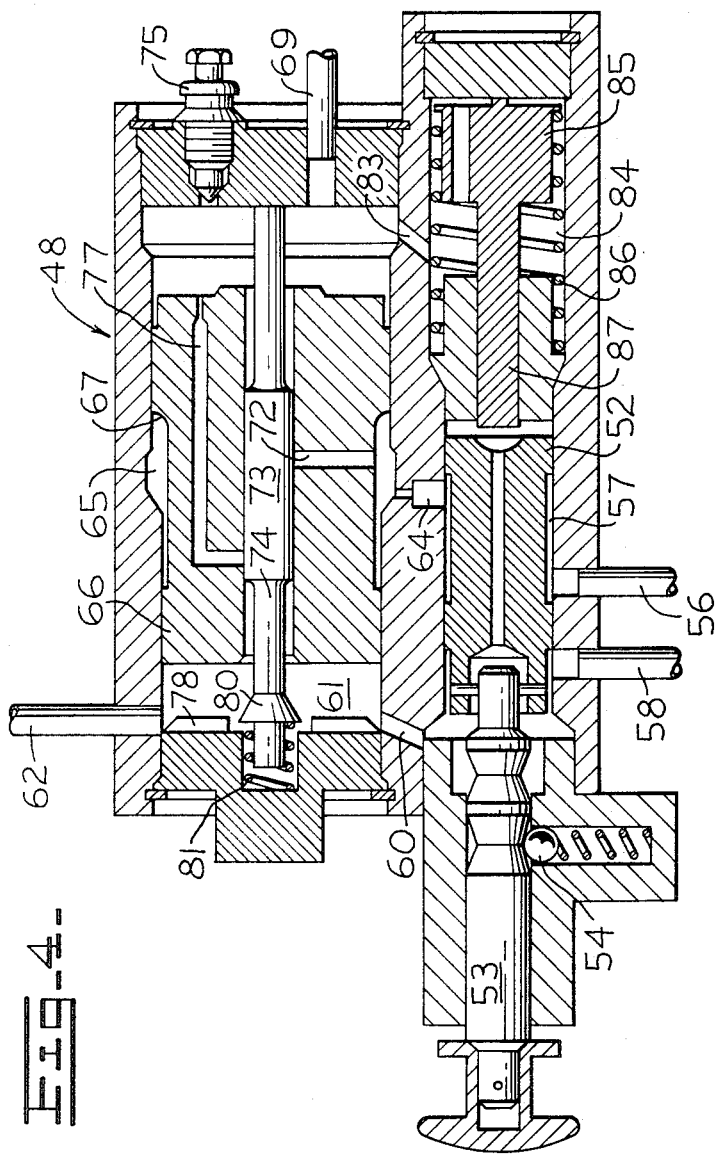

3,395,946

HYDRAULIC BRAKE CIRCUIT FOR DUAL VEHICLES

Jackson C. Medley, East Peoria, Donald L. Smith, Peoria, and Maurice F. Franz, East Peoria, Ill., assignors to Caterpillar Tractor Co., Peoria, Ill., a corporation of California
Filed Oct. 23, 1965, Ser. No. 502,916
2 Claims. (Cl. 303—2)

ABSTRACT OF THE DISCLOSURE

Brakes for two powered vehicles such as trucks or tractors, which are coupled for joint operation from either of two operating stations with a hydraulic circuit which enables the brakes for both vehicles to be applied from either operating station.

---

The invention will be useful in connection with various combinations of vehicles, such as tractors coupled in tandem or side by side combinations, as well as earthmoving scrapers coupled or tripled in tandem arrangements. The invention was, however, designed for, and has been applied to a large hauling vehicle comprising a body supported between two tractors disposed at its opposite ends and each having an operator's station containing complete controls for all controllable functions of the vehicle. One such vehicle is disclosed in our assignee's pending application of Ralph H. Kress and Jackson C. Medley for Suspension System for Heavy Vehicles, filed Sept. 21, 1965, Ser. No. 488,985, now Patent No. 3,330,578.

It is the object of this invention to provide a control circuit for the brakes of two vehicles, each having service brakes and parking brakes which will enable the application of the service brakes of both vehicles from either of two stations, and which will enable the application of the parking brakes of at least one vehicle from either station. Another object of the invention is to provide means in such a circuit for convenient release of any or all parking brakes which are engaged from either station. Another object is to provide such a system which utilizes only a single hydraulic line between circuits disposed on two vehicles. Further and more specific objects and advantages of the invention and the manner in which it is carried into practice will be apparent in the following specification wherein the invention is described in detail by reference to the accompanying drawings.

In the drawings:

FIG. 1 is a schematic view of the brake circuit of the present invention;

FIG. 2 is a schematic central sectional view of the master cylinder in a closed master-slave circuit which is illustrated in FIG. 1;

FIG. 3 is a similar view of a combined slave cylinder of the same circuit and brake control valve actuated thereby and;

FIG. 4 is a similar view of a safety brake control valve associated with the master-slave circuit and the pressure circuit of the system.

In FIG. 1 those portions of the circuit disposed on a first tractor and a second tractor are illustrated as separated by a broken line arranged centrally of the sheet. Since the components of the circuits on the two tractors are identical, the description of the first will suffice for an understanding of the second, and the reference characters used in connection with the description will be used primed on the components located on the second tractor.

Each control comprises a pressure circuit generally indicated at 10 and a master-slave circuit including the conduit illustrated as being of smaller size and generally indicated at 11. The master-slave circuits are connected by a single hose or conduit 12 which is the only line communicating between the two vehicles. Each tractor has a pair of service brakes 14 and a pair of parking brakes 15. In operation, a foot pedal 15 is employed to open a metering valve 17 of well-known construction to admit pressure in the circuit 10 from a source of hydraulic fluid under pressure, not shown, through conduits 18, 19 and 20, and a check valve 21. This fluid under pressure, normally blocked by the metering valve in its closed position, is admitted upon opening of the metering valve to actuate a master cylinder, generally indicated at 24, in the master-slave circuit. An accumulator shown at 25 is included in the circuit between the check valve and the metering valve to provide a limited amount of emergency fluid under pressure in the event of breakage or failure elsewhere in the pressure system.

Actuation of the master cylinder by depression of the foot pedal 16 causes actuation of the slave cylinder in a combination slave cylinder and brake control valve, generally indicated at 26. The master cylinder 24 is shown in FIG. 2 and the slave cylinder is shown in FIG. 3. When pressure enters the master cylinder at its upper end, as illustrated in FIG. 2, a sliding piston 28 therein is urged downwardly against the force of a spring 29 and forces fluid, which substantially fills the system at all times, outwardly through the lower end of the spring chamber, creating pressure throughout the entire master-slave system and actuating slave pistons 30 (see FIG. 3) in each of the slave valves 26 and 26'. In the event of leakage in the master-slave system, the master piston 28 will move downwardly beyond its normal stroke and make-up fluid will be supplied when a port 27 registers with an enlarged area 31 in the cylinder wall. Fluid passing into this area will pass through a port 27a also registering with the enlarged area, and enter the chamber of spring 29 as make-up fluid. The slave pistons 30 engage and move the spools 32 which form a part of the combined cylinder and valve. Downward movement of the spool against the force of a spring 34 which normally holds it in closed position opens communication between the pressure line 19 and a line 35 which leads to the service brakes 14 and actuates them through a conventional mechanism, not shown. In the closed position shown, the line 35 to the brakes is vented to the reservoir by a line 36. Since the brake control valve is a metering valve, the opening movement of the valve spool 32 is opposed by pressure as is characteristic of such valves. In this case the pressure being admitted through a passage 38 on the brake side, and a check valve 39 into a chamber 40. Pressure in the chamber 40 urges a small piston 41 upwardly to oppose the downward or opening movement of the valve spool. A small orifice in the check valve 39 indicated at 42 permits controlled downward movement of the spool 32 that would prevent sudden application of the brakes. A small valve shown at 44 in the upper portion of the slave cylinder may be opened manually when the system is being initially charged with hydraulic fluid in order to permit escape of air.

The means for actuating the parking brakes 15 also include the pressure system 10 and master-slave system 11, fluid from both being controlled by a combined valve and slave cylinder generally indicated at 48, and shown in detail in FIG. 4. The parking brakes are applied by springs contained in cylinders 50 shown in FIG. 1 and the springs are normally retracted and brakes released by application of pressure from the pressure system. Relief of this pressure to cause application of the parking brakes is accomplished with the valve shown in FIG. 4 in the following manner: A spool 52 is slidable to either of two positions by a manually actuated push rod 53 and held in either of these positions by means of detent mechanism including a ball 54. The spool is shown in its advanced position but, in its retracted position, fluid from the pressure system enters through a line 56 and communicates through a groove 57 in the spool with a line 58 communicating with the cylinders 50, opposing the spring force therein so that the brakes 15 are released. Upon inward movement of the plunger 53, the spool is moved to the position shown, closing communication between the lines 56 and 58 and communicating the brake cylinder to the sump through the valve cylinder, a passage 60, the inner end of a secondary master cylinder 61, and a vent line 62. Thus, the parking brakes 15 on one tractor are engaged.

Since the system is applied to very heavy equipment, the service brakes are also used as parking brakes, and the service brakes of both tractors are applied automatically upon adjustment of the valve spool 52 in FIG. 4 as described above. In the position shown with the parking brakes of one tractor applied, pressure from the line 56 is communicated through the groove 57 and a passage 64 to a groove 65 in the periphery of a secondary master piston 66. Pressure in the groove 65 is exerted against a shoulder 67 therein to urge the secondary master piston 66 toward the right, as shown in the drawing, increasing pressure in line 69 which forms a part of the master-slave system, and thus actuating the slave piston 30 (see FIG. 3) in the valves 26 and 26' and applying all of the service brakes in the manner hereinabove described.

In the event of leakage in the master-slave system which would tend to release the brakes, pressure from line 56 will urge master piston 66 toward the right and maintain sufficient pressure in the system to prevent release of the brakes. Just prior to the piston engaging the end of the cylinder, a passage 72 in the piston will be opened upon passing the end of an enlarged portion 73 in a valve stem 74, which extends through a central bore of the piston. This will admit fluid from the pressure system to the master-slave system, returning the master piston to the position illustrated. An air bleed-off valve 75 operates in the manner of the valve 44 shown in FIG. 3 to relieve entrapped air when the system is being charged.

If expansion of liquid in the master-slave system due to temperature variation moves the master piston 66 toward the left an appreciable distance, excess fluid will be vented through a passage 77 in the piston which will be opened as its inner end crosses the end of the enlargement 73. This same passage serves to vent excess liquid in the master-slave system when the parking brakes are released by pressure with the plunger 53 and spool 52 in their retracted positions. In this case, pressure from line 56 is not communicated to piston 66 to cause it to advance toward the right and pressure in the master-slave system moves piston 66 to the left until it engages a stop 78 which is grooved to permit flow toward the vent line 62. At this time, the central bore of the piston 66 will be closed by a valve 80 on the valve stem 74 so even with the passage 77 communicating with the bore, pressure from the master-slave system will not be vented until it attains a predetermined value which is sufficient to overcome the force of a spring 81 to permit opening of the valve.

Since the valve assembly 48 on the first tractor and the valve assembly 48' on the second tractor are identical, both sets of parking brakes may be applied simply by depressing the plunger 53 of each valve. One or both sets of parking brakes and both sets of service brakes may all be released simultaneously by a full depression of either of the pedals 16 or 16' so that the operator, upon entering the operator's cab of either tractor, can instantly release all brakes. Depression of the pedal 16 increases pressure in the master-slave system and communicates pressure through a passage 83 (see FIG. 4) to a spring chamber 84 and behind a piston 85 normally retracted by a spring 86. This moves the piston and a plunger 87 thereon to the left to engage the spool 52 and force it to the left, also forcing the plunger 53 to its outer position where it is again retained by the detent 54. This reestablishes communication of pressure from line 56 with the parking brake cylinders 50, thus releasing the parking brakes. The service brakes are released upon removal of the operator's foot from the pedal 16, momentarily reducing pressure throughout the master-slave system and permitting retraction of slave piston 30 (FIG. 3), and shifting of spool 32 to its brake release position.

We claim:
1. A brake circuit for two vehicles coupled for joint operation from either of two operating stations comprising hydraulic service brakes on each vehicle, a separate pressure hydraulic circuit on each vehicle, a valve in each circuit to direct pressure to the brakes for engaging them, a master-slave circuit common to both vehicles, said master-slave circuit including a slave piston for each of said valves and a master piston operable from either station to activate the slave pistons to open said valves, each vehicle having parking brakes, means at each operating station to set the parking brakes of one vehicle, and means at each operating station to release the parking brakes of both vehicles.

2. The combination of claim 1 in which the means to release the parking brakes includes the slave circuit common to both vehicles.

References Cited

UNITED STATES PATENTS

| 1,987,435 | 1/1935 | Engel | 303—24 XR |
| 2,065,017 | 12/1936 | Oliver | 303—13 XR |
| 3,241,888 | 3/1966 | Ternent | 303 |
| 3,250,575 | 5/1966 | Shilton | 303—2 |
| 3,265,162 | 8/1966 | Botterill | 303—2 |

UNITED STATES PATENTS 1,043,376   11/1958   Germany.

MILTON BUCHLER, *Primary Examiner.*

G. E. A. HALVOSA, *Assistant Examiner.*